United States Patent [19]

Fan et al.

[11] 4,331,553

[45] May 25, 1982

[54] FRIT MATERIAL FOR USE WITH PHOSPHOR COATING IN FLUORESCENT LAMP

[75] Inventors: Albert K. Fan; Vincent Chiola, both of Towanda, Pa.

[73] Assignee: GTE Products Corporation, Stamford, Conn.

[21] Appl. No.: 198,753

[22] Filed: Oct. 20, 1980

[51] Int. Cl.³ ............................................. C09K 11/02
[52] U.S. Cl. ......................... 252/301.36; 252/301.4 P; 106/286.2; 106/286.6
[58] Field of Search .......................... 106/286.2, 286.6; 252/301.36, 301.4 R, 301.4 P; 427/67

[56] References Cited

U.S. PATENT DOCUMENTS 3,661,608  5/1972  Ralston .............................. 106/286

Primary Examiner—Allan Lieberman
Assistant Examiner—Patricia Short
Attorney, Agent, or Firm—James Theodosopoulos

[57] ABSTRACT

A frit material that improves the adhesion of phosphor coatings in fluorescent lamps has the general composition $(Ca,Ba)O \cdot B_2O_3 \cdot P_2O_5$.

2 Claims, 1 Drawing Figure

U.S. Patent
May 25, 1982
4,331,553
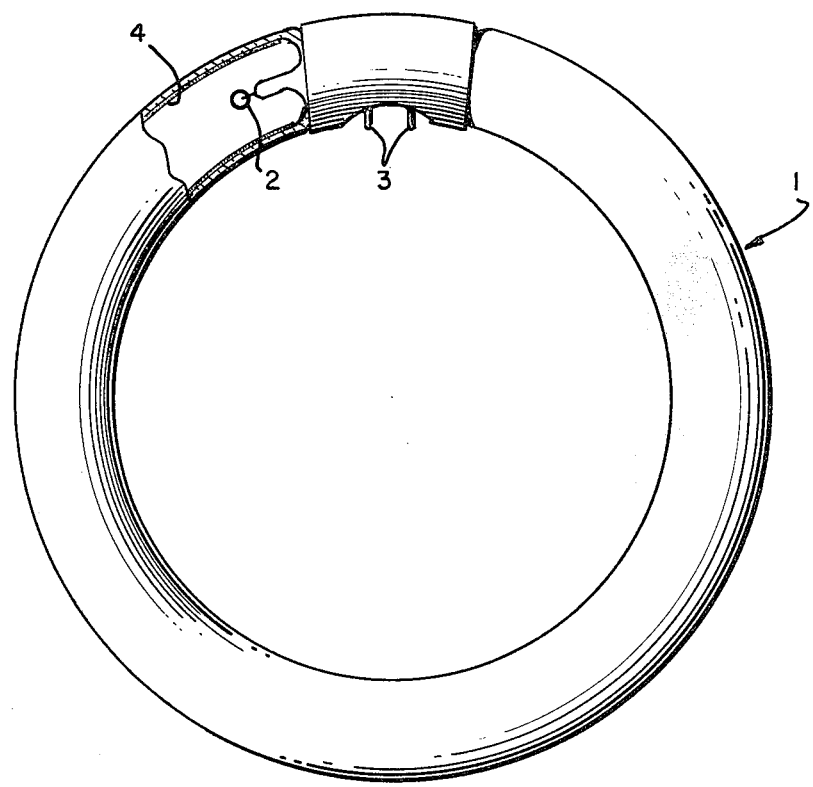

FRIT MATERIAL FOR USE WITH PHOSPHOR COATING IN FLUORESCENT LAMP

TECHNICAL FIELD

This invention relates to fluorescent lamps, particularly annular shaped fluorescent lamps, and to the use of a frit material to improve the adhesion of the phosphor coating to the lamp envelope.

BACKGROUND ART

Annular fluorescent lamps are generally manufactured by phosphor coating a straight glass envelope, baking the coating, heating the coated glass envelope to its softing temperature and then bending the coated envelope to a torus shape. If an adhesive is not used with the phosphor coating, the coating can flake or peel off during the bending operation. Adhesive materials that have been used in the past are alkali and alkaline earth borates, such as are disclosed in U.S. Pat. Nos. 2,905,572, 3,503,780 and 4,121,132. Zinc phosphate has also been used, as disclosed in U.S. Pat. No. 3,963,639.

A problem with the use of borates as the adhesive in phosphor coating is that it is difficult to remove all traces of water therefrom during lehring. Residual water in the coating is detrimental to lamp operations and lamp life. A problem with the use of zinc phosphate as the adhesive is that it does not have adequate adhesive power to prevent flaking during bending.

DISCLOSURE OF INVENTION

This invention discloses a frit material which can be added in the phosphor suspension and which improves the adherence of the phosphor to the interior wall of the lamp envelope. The frit material softens during lehring and improves the bonding of the phosphor particles to each other and to the glass wall envelope. The adhesive is an amorphous borate-phosphate frit material having the general composition $Ca_{1-x+2n}Ba_xO_{1+2n} \cdot mB_2O_3 \cdot nP_2O_5$, where $x = 0.3 \pm 0.1$, $m = 2 \pm 0.3$ and $n = 1 \pm 0.3$. The frit material is added to an aqueous suspension of phosphor particles which is milled to the desired consistency, and then coated on the inner tubular envelope wall. The envelope is then air lehred to remove organic binder and is subsequently reheated and bent into a torus shape. The borate-phosphate frit of this invention provides very good adhesion of the phosphor and also provides good lamp brightness. The borate-phosphate frit fuses more readily than previous frits and is especially advantageous in small diameter circular fluorescent lamps.

BRIEF DESCRIPTION OF THE DRAWING

The drawing shows an annular shaped fluorescent lamp, partly in section, incorporating the frit material of this invention.

BEST MODE FOR CARRYING OUT THE INVENTION

A borate-phosphate frit material according to this invention has the general formulation $Ca_{1-x+2n}Ba_xO_{1+2n} \cdot mB_2O_3 \cdot nP_2O_5$. The addition of phosphate to the raw mixture results in a lower melting point amorphous frit as compared to the crystalline frit disclosed in 3,503,780 which does not contain phosphate. The borate-phosphate frit can be considered as a eutectic melt of $Ca_{1-x}Ba_xB_4O_7$ and $Ca_2P_2O_7$, with the ratio of the latter to the former being approximately equal to n. The borate-phosphate frit has lost the crystalline structure and properties of both the $Ca_{1-x}Ba_xB_4O_7$ and $Ca_2P_2O_7$. The addition of the phosphate group has improved the bonding and adhesion of the phosphor particles to themselves as well as to the glass envelope, especially in the case of the commonly used halophosphate phosphors.

The frit material is generally prepared by (1) homogeneous mixing of raw material in a blender, (2) firing of the intimate mixture in a furnace, (3) milling of cooled frit material to a fine powder, and (4) sieving the powder through fine meshed screens. The raw material may be introduced in various forms of compounds as in the art of phosphor manufacture; for example, calcium and barium may be introduced as the forms of hydroxide, carbonate, nitrate and sulfate; boron may be introduced as boric acid; and phosphate may be introduced as calcium pyrophosphate, calcium hydrogen phosphate, and/or various forms of ammonium phosphate. However, best results were obtained when alkaline earth hydroxide, boric acid and calcium hydrogen phosphate were used. As is known in the phosphor art, the purity of the ingredients is important; therefore, only reagent or better grade chemicals are used. The blending may be accomplished in a conventional twin shell blender or other blending device which gives homogeneous mixing. In order to obtain an intimate mixture, only fine size particles of less than 100 microns are used. The solid state reaction is carried out by firing the intimate mixture in a furnace at a temperature from about 600° to 1000° C. to produce the frit composite. The furnace atmosphere is not critical; therefore electrical or gas fired furnaces may be used. The firing or calcine time may vary from 0.5 to 5 hours. The material may be reground and refired if desired; however, one step firing was sufficient to produce satisfactory frit material for lamp application. After the material has been removed from the furnace and cooled, it is milled and sieved. The frit must be in fine powder form to blend with phosphor powder and to provide adequate bonding strength for lamp application. Either wet or dry milling can be used, and powder passing through a 200 mesh screen was satisfactory for use in circular fluorescent lamps. The frit to phosphor ratio may vary from about 2 to 10% by weight; normally, 4% is sufficient to provide enough adhesive power without sacrificing brightness.

In one example, 51.86 grams $Ca(OH)_2$, 96.64 grams $Ba(OH)_2 \cdot 8H_2O$, 247.32 grams $H_3BO_3$ and 240.3 grams $CaHPO_4$ were blended in a shaker until homogeneous and then loaded in a 7¾ inch high crucible. The crucible was covered and the mixture was then fired in a gas furnace at 800° C. for 3 hours. After firing and cooling, the mixture was ballmilled and sieved through 200 mesh screens.

The advantages of this frit over prior art frits is its superior adhesion of the phosphor to the glass and its lower fusion temperature. An important feature of the frit is its essentially complete transparency to visible light, 400 to 700 nanometers. Thus, use of the frit does not substantially detract from lamp efficiency in that the frit will not add adsorptive characteristics to the phosphor coating.

A fifty pound batch for a small scale production quantity could be prepared as follows. 4.1 lbs of calcium hydroxide, 7.5 lbs of barium hydroxide octahydrate, 19.5 lbs of boric acid and 18.9 lbs of calcium hydrogen phosphate are throughly blended in a drum for one hour. The raw material blend is then loaded into crucibles, for example, seven inch high silica crucibles, and covered. The crucibles are then fired in a gas fired furnace for three hours at 800° C. The crucibles are then removed from the furnace and allowed to cool to room temperature, after which the material is broken by suitable crushing or milling means, and then sifted through a 100-mesh screen.

The screened product has the following typical chemical analysis: 25-28% by weight calcium; 5.2-7.5% barium; 6.0-7.1% boron; and 37-45% phosphate. X-ray analysis shows the material to have an amorphous structure. Spectrophotometrically, the product is transparent in the visible spectrum, 400 to 700nm. The softening point of the frit is less than 600° C.

The drawing shows a circular fluorescent lamp in which the frit of this invention can be used. The lamp comprises a circular glass envelope 1 sealed at each end, as is well known. The lamp contains the usual electrode 2 at each end. The electrodes are contacted to base pins 3 for energizing the lamp. Disposed on the inner surface of envelope 1 is a phosphor coating 4 which contains a small amount of the borate-phosphate frit of this invention. In one example for FC8T9/CW 22 watt circline fluorescent lamps employing this invention, straight glass tubes of the proper length were internally coated with an aqueous suspension of cool white halophosphate phosphor containing 4% of borate-phosphate frit as per this invention. The amount of phosphor plus frit deposited in each tube was about 2 grams. The coated tubes were then dried with hot air to evaporate the water. The coated tubes were then lehred at about 600° C. This lehring step drives off water soluble organic matter that was used as a binder in the aqueous suspension. During this step, some of the borate-phosphate frit is melted, but not enough to complete the fusion process. The glass tubes are then heated to about 700° C., and are then bent to the circline shape. This completes the fusion process of the frit. The lamp is then completed in the usual manner.

A comparison was made of such FC8T9/CW lamps containing 4% of the borate-phosphate frit as per this invention in comparison to lamps containing 4% of the glass frit that was used in the prior art. The results as as follows, in Table I.

TABLE I

| Phosphor Coating | Lumens, 0 hours | Lumens, 100 hours | 100 hour maintenance | Lumens, 500 hours | 500 hour maintenance |
|---|---|---|---|---|---|
| Cool White plus 4% borate-phosphate frit | 1142 | 1097 | 96.1% | 1037 | 90.8% |
| Cool White plus 4% glass frit | 1148 | 1067 | 92.9% | 988 | 86.1% |

It can be seen that the frit of this invention yielded improved maintenance both at 100 hours and at 500 hours. In addition, the adhesion of this frit was superior to that of the prior art glass frit.

What is claimed is:

1. A low melting point amorphous borate-phosphate frit material having the general composition $Ca_{1-x+2n}Ba_xO_{1+2n} \cdot mB_2O_3 \cdot nP_2O_5$, wherein x is between about 0.2 to 0.4, n is between about 0.7 to 1.3, and m is between about 1.7 to 2.3.

2. An aqueous suspension for depositing a phosphor coating on a lamp envelope comprising finely divided phosphor particles dispersed in water; a temporary organic binder which can be essentially completely removed from a lamp envelope on which the phosphor coating has been deposited upon firing under appropriate conditions; and a minor amount of an amorphous borate-phosphate adhesive frit which will bond the phosphor particles to each other and to the lamp envelope upon firing under appropriate conditions, wherein the amount of borate-phosphate frit equals about 2 to 10 weight percent of the phosphate and the frit has the composition $Ca_{1-x+2n}Ba_xO_{1+2n} \cdot mB_2O_3 \cdot nP_2O_5$, where x is between about 0.2 to 0.4, n is between about 0.7 to 1.3, and m is between about 1.7 to 2.3.

* * * * *